Oct. 20, 1953 L. H. BEST ET AL 2,656,050
DOLLY FOR ROLLED MATERIALS SUCH AS CARPETING
Filed Oct. 12, 1950 6 Sheets-Sheet 1

Inventors:
Leon H. Best and
Oscar W. Johnson
By Wallace and Cannon
Attorneys

Oct. 20, 1953     L. H. BEST ET AL     2,656,050
DOLLY FOR ROLLED MATERIALS SUCH AS CARPETING
Filed Oct. 12, 1950     6 Sheets-Sheet 2
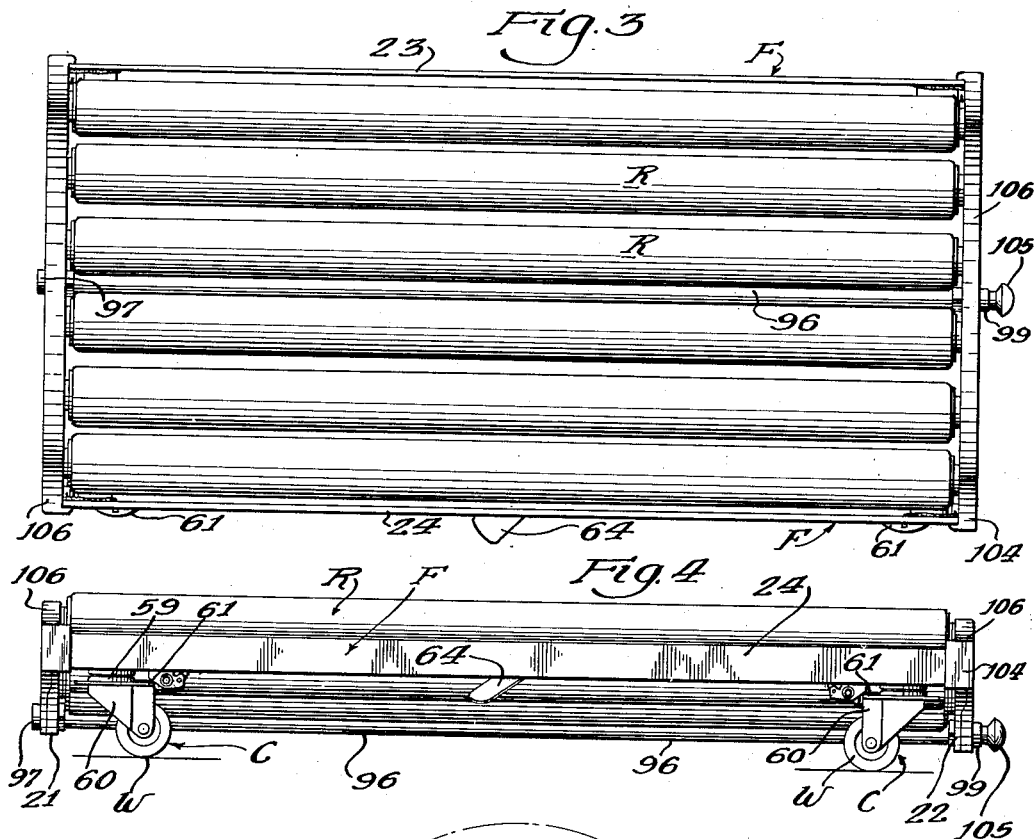
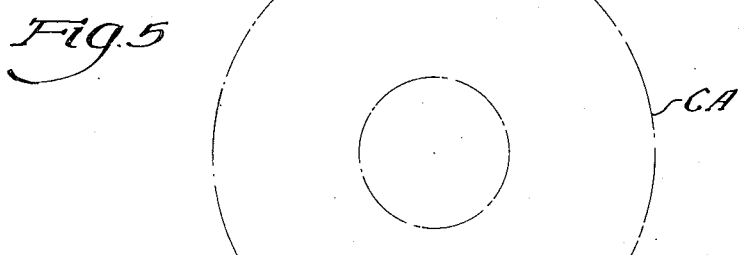
Inventors
Leon H. Best and
Oscar W. Johnson
By: Wallace and Cannon
Attorneys Oct. 20, 1953 L. H. BEST ET AL 2,656,050
DOLLY FOR ROLLED MATERIALS SUCH AS CARPETING
Filed Oct. 12, 1950 6 Sheets—Sheet 3
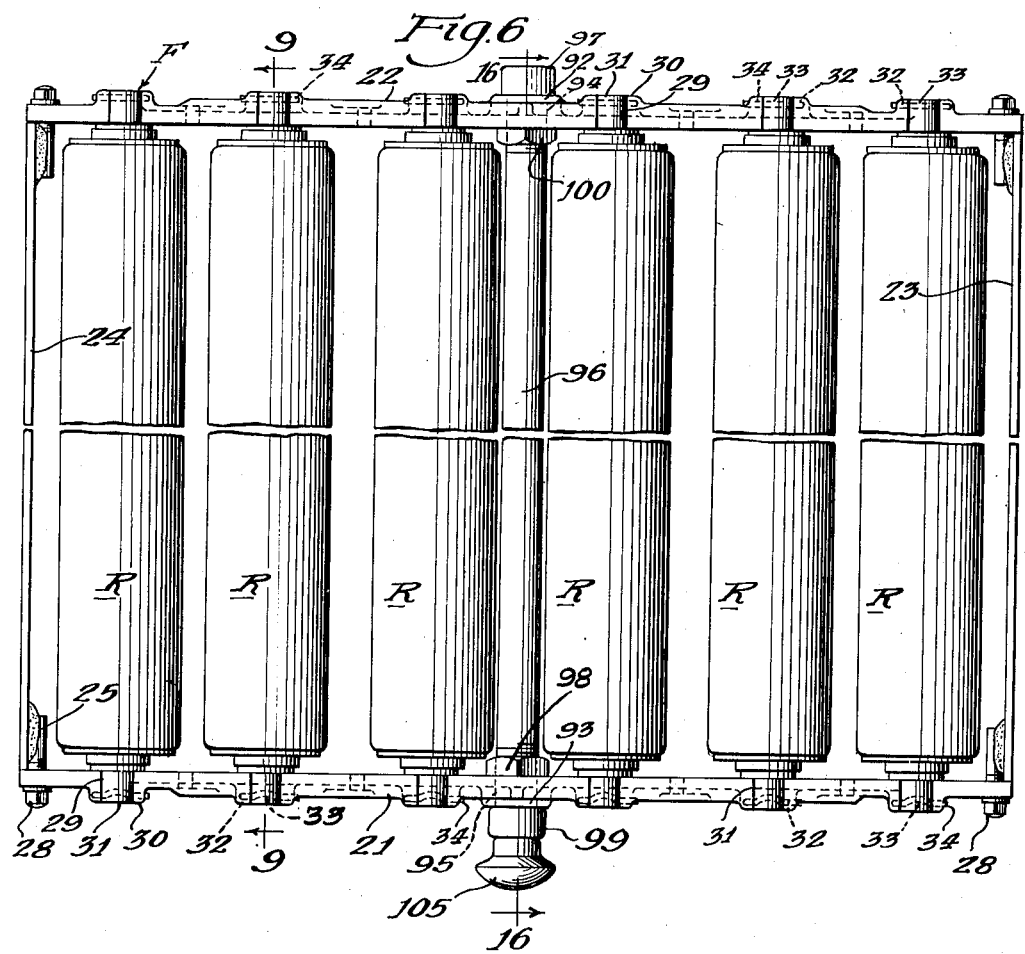
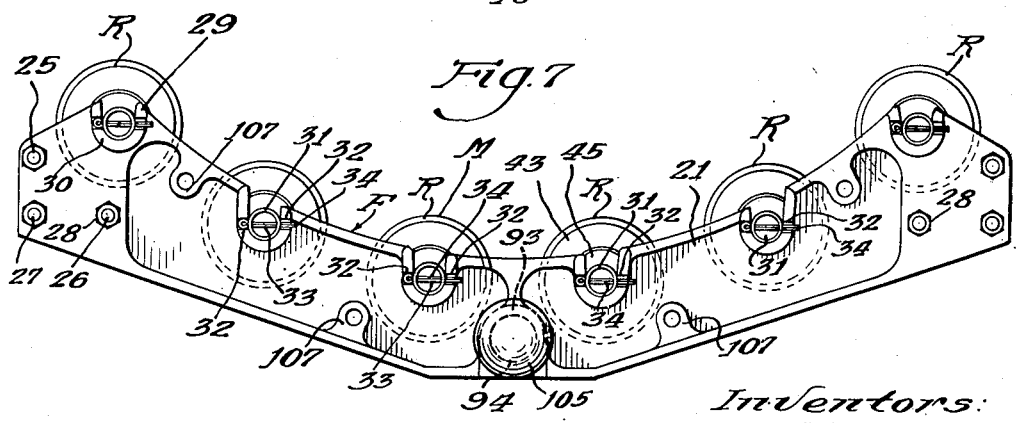
Inventors:
Leon H. Best and
Oscar W. Johnson
By Wallace and Cannon
Attorneys Oct. 20, 1953  L. H. BEST ET AL  2,656,050
DOLLY FOR ROLLED MATERIALS SUCH AS CARPETING
Filed Oct. 12, 1950  6 Sheets-Sheet 4
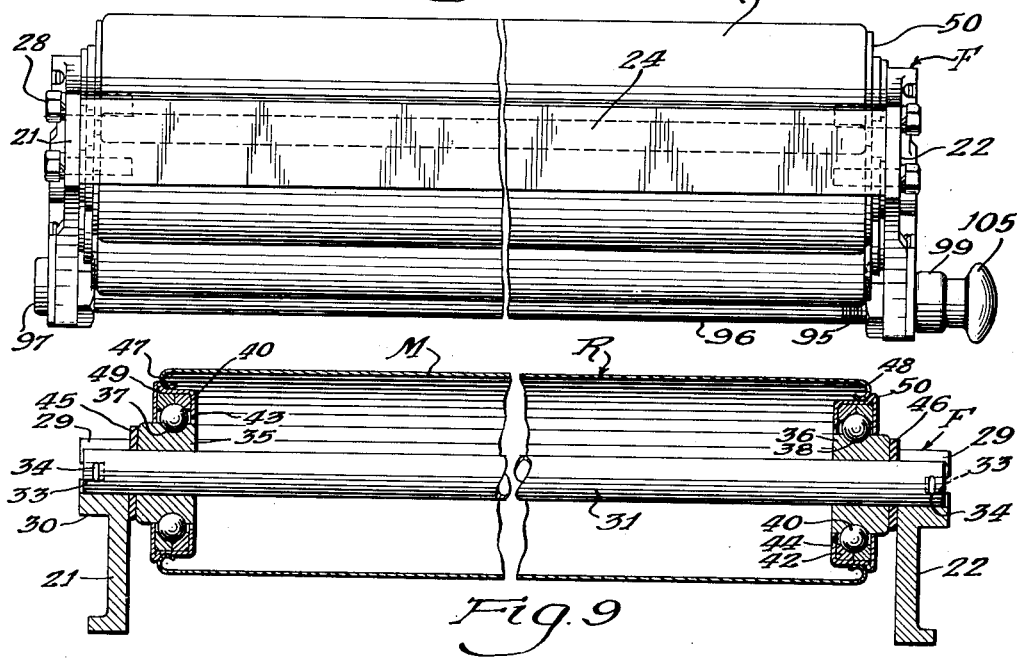
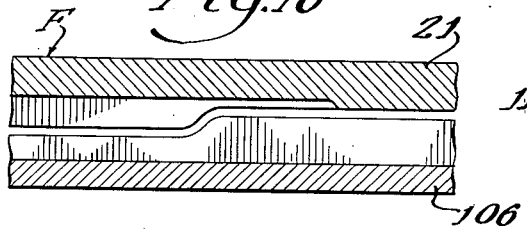
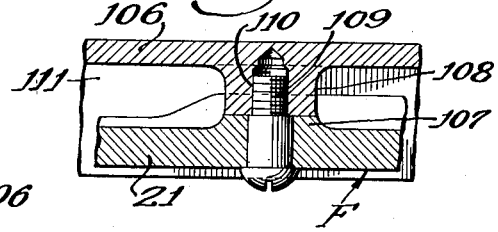
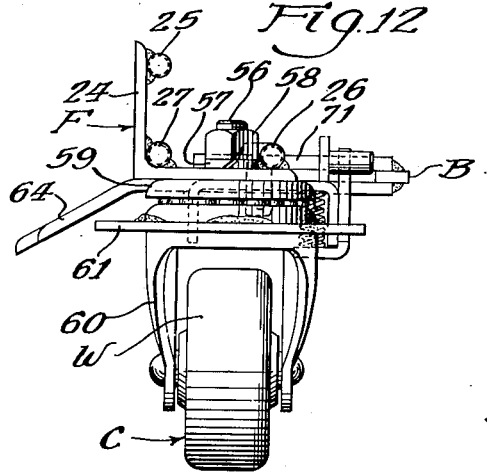
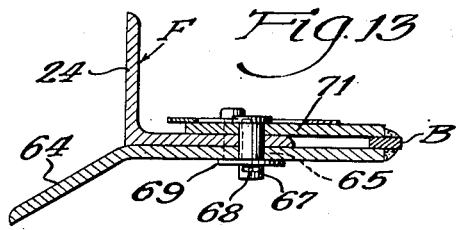
Inventors:
Leon H. Best and
Oscar W. Johnson
By Wallace and Cannon
Attorneys

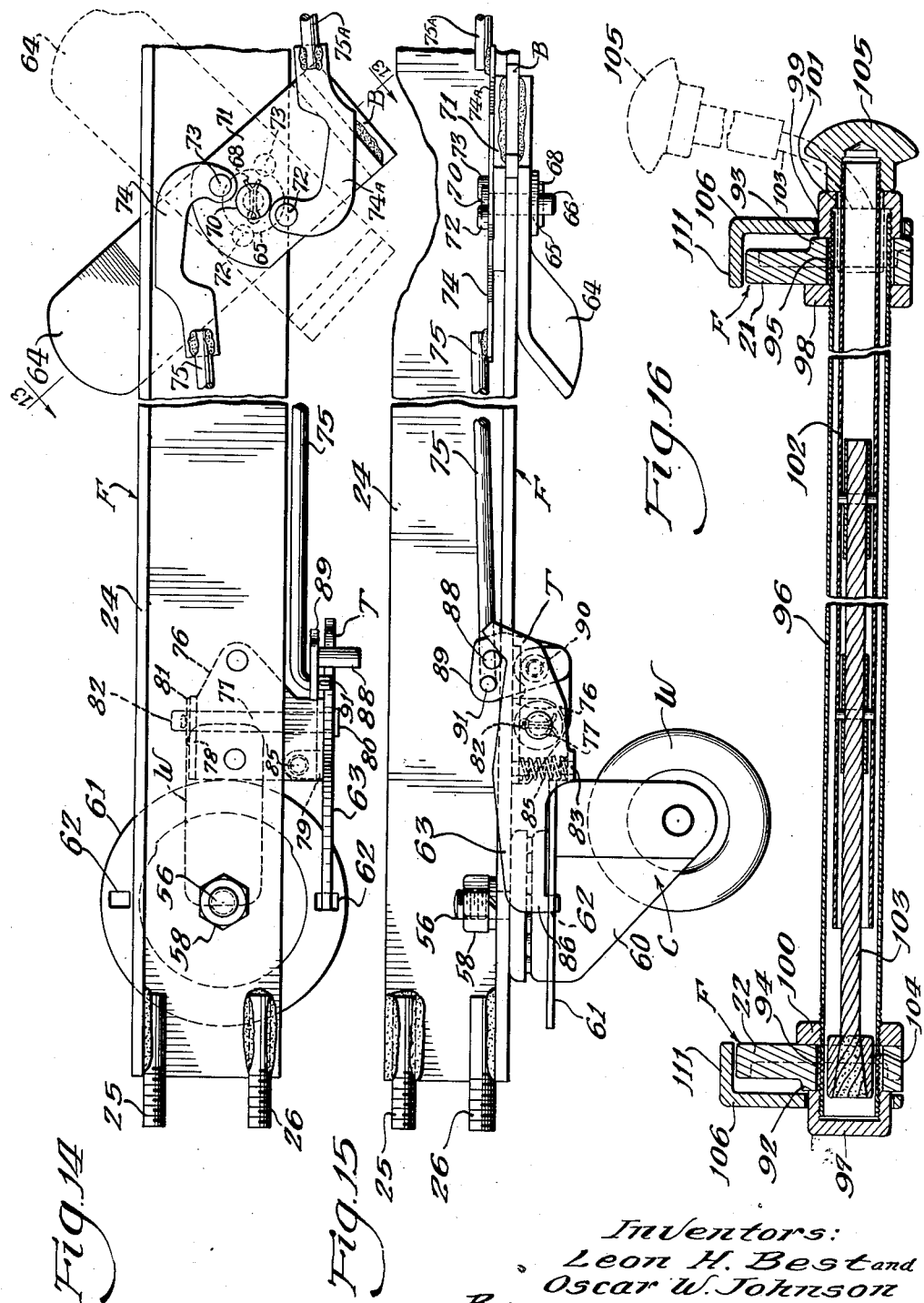

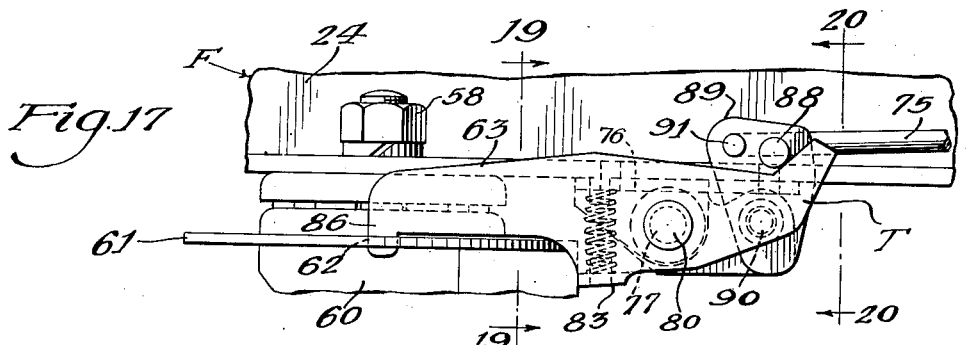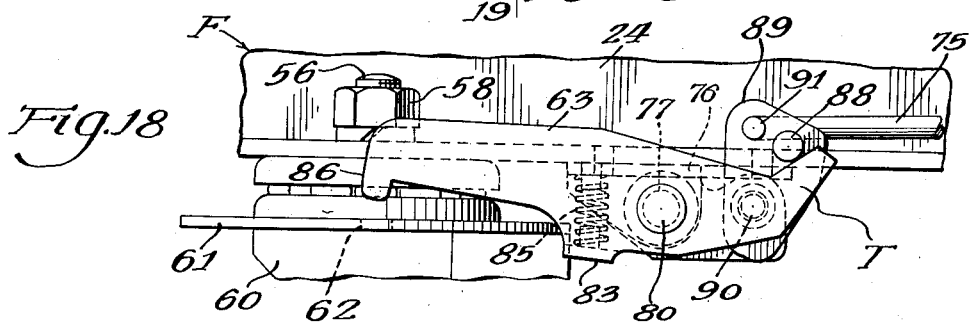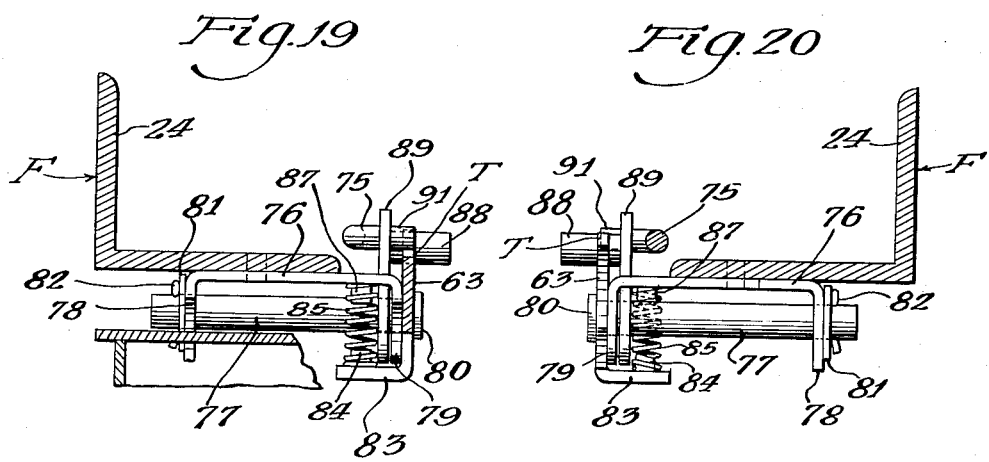

Patented Oct. 20, 1953

2,656,050

UNITED STATES PATENT OFFICE 2,656,050

DOLLY FOR ROLLED MATERIALS SUCH AS CARPETING

Leon H. Best and Oscar W. Johnson, Galva, Ill., assignors to John H. Best & Sons, Inc., Galva, Ill., a corporation of Illinois Application October 12, 1950, Serial No. 189,869

12 Claims. (Cl. 214—1)

This invention relates to dollies of the kind particularly adapted for transportation of broadloom carpeting and the like.

Broadloom carpeting is usually supplied in rolls from which it is unwound to be wound onto spindles in suitable racks for display purposes and to facilitate cutting and other handling of the carpet. The present invention has to do with a dolly that may be employed in association with broadloom carpeting to enable transportation thereof from one place to another to be effected expeditiously and also to facilitate unrolling of the carpet from the rolls in which it is wound, especially when the same is to be wound upon spindles in a suitable rack, and to afford a novel dolly particularly adapted to effect the foregoing is the primary object of this invention.

Another object of this invention is to provide rotatable members in a dolly of the aforesaid character onto which a roll of broadloom carpet or the like may be placed so that rotation of the rotatable members, in the course of unwinding movement from the roll of carpeting supported thereby will facilitate such unwinding and an object ancillary to the foregoing is to afford a simple and economical mounting for rollers of the aforesaid character.

Another object is to equip a dolly of the aforesaid character with a handle arrangement through the intermediary of which the dolly may be readily moved from one place to another and which is of such nature that it may be disposed in the dolly in an out of the way position when not in use.

Further objects of the invention are to equip a dolly of the aforesaid character with casters on which the dolly may be moved from one place to another and to so arrange at least certain of such casters that they may be retained in a predetermined relation with the dolly and thereby limit movement of the dolly especially during unwinding of a roll of broadloom carpeting or the like mounted on the dolly; to afford a common arrangement for operating the means effective to lock the casters in the aforesaid predetermined position; and to afford an arrangement for operating the aforesaid common means which will be readily accessible when required but which will not interfere with the normal use of the dolly.

A yet further object is to afford a simple arrangement for securing together the elements of the frame of the novel dolly of this invention, and an object ancillary to the foregoing is to weld or otherwise suitably secure bolts or the like to the ends of certain of the frame elements so that such bolts may be passed through openings in other of the frame elements and be then secured against displacement to thereby firmly assemble the frame of the dolly.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view showing dollies of the present invention, with ramps in association therewith, in position to receive a roll of broadloom carpeting or the like;

Fig. 3 is a plan elevational view of the novel dolly of the present invention;

Fig. 4 is a side elevational view of such a dolly;

Fig. 5 is an end elevational view of the dolly;

Fig. 6 is a plan view of my novel dolly, drawn to a scale larger than Fig. 3 and in which the novel frame covers of the present invention are eliminated;

Fig. 7 is an end view of the dolly as shown in Fig. 6;

Fig. 8 is a side elevational view of the dolly as shown in Fig. 6;

Fig. 9 is a sectional detail view taken substantially on the line 9—9 on Fig. 6;

Figure 1:
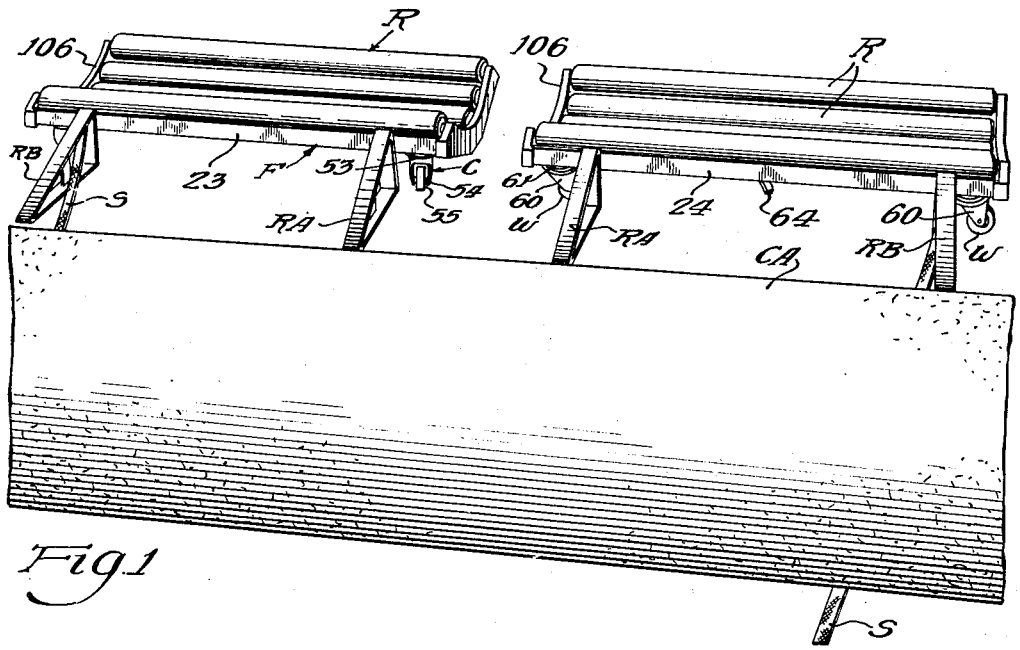

Figs. 10 and 11 are sectional detail views taken substantially and respectively on lines 10—10 and 11—11 on Fig. 5;

Fig. 12 is a detail view showing one of the casters which may be locked in predetermined angular relation with the frame of the dolly, the means for operating the caster locking arrangement and also elements effective to interconnect certain portions of the frame elements;

Fig. 13 is a sectional detail view showing a part of the arrangement depicted in Fig. 12;

Fig. 14 is a fragmentary plan view of the arrangement effective to lock certain of the casters in predetermined angular relation with the frame of the dolly;

Fig. 15 is a fragmentary side elevational view of the parts shown in Fig. 14;

Fig. 16 is a sectional view taken on the line 16—16 in Fig. 6;

Figs. 17 and 18 are fragmentary side elevational views illustrating certain of the parts depicted in Fig. 15 and particularly showing a retaining pawl in the operative and inoperative positions thereof; and Figs. 19 and 20 are sectional detail views taken substantially and respectively on the lines 19—19 and 20—20 on Fig. 17.

The novel dolly illustrated in the accompanying drawings includes a frame generally indicated by F and embodies a front end member 21, a rear end member 22, and side frame members respectively designated 23 and 24. The side frame members 23 and 24, as best shown in Figs. 12, 13, 14 and 15, are formed of angle iron, and are disposed to have one of the flanges thereof arranged in a vertical plane with the other flanges disposed in a horizontal plane and extended inwardly of the frame F.

By referring to Figs. 12, 14 and 15, it will be seen that a headless bolt or rod 25 is welded or otherwise suitably secured to the vertical flange of the side frame member 24 inwardly and near the upper edge thereof. Still another headless bolt or threaded rod 26 is welded or otherwise suitably secured to the horizontally disposed flange of the side frame member 24 inwardly and near the free edge thereof. Yet another headless bolt or threaded rod 27 is welded or otherwise suitably secured inwardly of the angle iron side frame member 24 at the juncture of the vertical and horizontal flanges thereof. As best shown in Figs. 14 and 15, the threaded free end portions of the headless bolts 25, 26 and 27 project beyond the adjacent end of the frame member 24. Headless bolts, as 25, are secured in the above described manner and in the above described positions at each end of the side frame members 23 and 24.

As best shown in Fig. 7, each end member as 21 is substantially crescent-shaped longitudinally thereof with the intermediate portion of the arc of such shape faced downwardly. A set of three openings is provided adjacent each end of the frame member 21, and these openings of each set are related one to the other in the same manner as that in which the bolts 25, 26 and 27 are related one to the other. Hence, when the frame is to be assembled, the bolts as 25, 26 and 27 at one end of a side frame member as 24 are passed through openings at one end of a side frame member as 21 and nuts as 28 are run onto the threaded portions thereof, outwardly of frame member as 21, and this is effective to secure the abutting ends of such side and end frame members in fixed relation, this same connection being effected at each corner of the frame F. It will thus be seen that an economical yet effective arrangement is provided for securing together the elements of the frame F.

It is advantageous in a dolly of the kind to which this invention pertains to provide rollers onto which a roll of broadloom carpeting or the like may be introduced, since so to facilitate unwinding of the roll of carpeting. To this end a dolly of the present invention includes a plurality of rollers as R. These rollers are mounted in the frame F in such a manner as to enable expeditious and economical mounting or dismounting thereof on or from the frame F.

In the present instance, rollers as R are provided in the dolly and these are related one to the other in a crescent formation similar to the crescent formation of the end members as 21. In order to support the rollers in such relation one with the other, sockets as 29 are provided to open into the upper edge of the end frame member as 21, and as best shown in Fig. 9, the end frame members adjacent each socket include a flange 30 to thereby elongate axially each socket, as 29. The sockets as 29 formed in the frame members 21 and 22 are respectively aligned one with the other, and as best shown in Fig. 9, a shaft as 31 is mounted in each set of aligned sockets to extend therebetween. The flange as 30 of each of the sockets as 29 has aligned openings 32 formed therein and a slot, as 33, extends inwardly from each end of the shaft 31. A cotter key 34 is passed through the aligned openings 32 and the slot 33 and is thereby effective to prevent endwise and rotative movement of the shaft 31 relative to the sockets 29 in which it is mounted.

Rings as 35 and 36, Fig. 9, are keyed or otherwise suitably secured to each shaft 31 inwardly of the respective ends thereof and raceways as 37 and 38 are formed in the peripheries of the rings 35 and 36, respectively. Balls as 40 are mounted in the raceways 37 and 38 and are retained therein by outer raceways as 41 and 42, respectively disposed outwardly of the rings 35 and 36 and which are retained in position by housings as 43 and 44. In this manner, a ball bearing support is afforded adjacent each end of each shaft 31 for the rotatable portion of each roller R. Thrust collars as 45 and 46, Fig. 9, are respectively disposed between the outwardly disposed ends of the rings 35 and 36 and the adjacent inner ends of the sockets 29 in which the shaft as 31 is mounted.

Each roller R includes a tubular member M formed from sheet metal and having rolled end portions as 47 and 48, Fig. 9, at each end thereof. The housings 43 and 44 respectively include an upturned flange portion as 49 and 50 which are disposed respectively outwardly of the rolled end portions 47 and 48 whereby the tubular member M affording a rotatable portion of the roller R is effectively secured to the housings as 43 and 44 to be rotatable on the shaft as 31. It will be understood that each of the rollers that are included in the dolly are mounted therein in the manner just explained and illustrated in Fig. 9.

In order to enable the dolly to be transported from one place to another casters as C are provided thereon which are mounted beneath the horizontally disposed flanges of the side frame members 23 and 24. The casters C associated with the side frame member 23 are of a conventional design and include a stud as 51, Fig. 5, which extends through the horizontal flange of the side member 23, and a nut 52 or the like is mounted thereon to secure the caster in position. Each such caster C includes a conventional ball bearing arrangement 53 which supports the U-shaped wheel bracket as 54 of the caster for free rotative movement in a horizontal plane relative to the side frame member 23, the wheel as 55 being mounted in the bracket 54 for rotation in a vertical plane.

The casters C associated with the side frame member 24 are somewhat similar to those associated with the side frame member 23 in that each such caster C includes a threaded stud as 56, Fig. 12, which extends through the horizontal flange of the side frame member 24 and a lock washer 57 is disposed beneath the nut 58 that is mounted on threaded stud 56 to secure the caster structure in position. The usual ball bearing arrangement as 59 is provided for the wheel bracket 60 in which a wheel W is mounted for rotative movement.

In the instance of the casters C associated with the side frame member 24, the conventional caster arrangement just described includes an additional element, namely, a circular disc 61 which is secured to the roller support at 60 for rotative movement therewith. Each disc 61 has openings as 62, Fig. 14, formed therein in diametrically opposed relation and a pawl as 63, Figs. 14, 15, 17 and 18, is adapted to seat in one or the other of the openings 62 as will be explained presently. Each opening 62 is so located in the disc 61 that when the pawl 63 seats in one or the other of these openings, the support 60 and the wheel W will be held against rotative movement in a horizontal plane and, as best shown in Fig. 12, the wheel W will be retained in position for rotative movement in a vertical plane in the direction lengthwise of the side frame member 24.

A caster arrangement as C, such as that just described, is associated with the side frame member 24 adjacent each end thereof and a simple and economical arrangement is provided for simultaneously operating the pawls 63 to move the same into and out of operative relation with the openings as 62 and discs as 61 of such caster arrangements. Thus, substantially midway in the extent of the side frame member 24, a lever 64 is provided which includes a downwardly extending end portion that is disposed to extend outwardly of the vertical flange of the side frame member 24 as best shown in Figs. 12 and 13. The lever 64 has an opening 65, Fig. 13, formed therein and through which the lower end portion of a headed stud 66 is extended. An opening 67 is formed in the portion of the stud 66 extended outwardly of lever 64 and a cotter key 68 is passed through this opening to retain a washer 69 in engagement with the lever 64 and this, in turn, is effective to retain the lever 64 in close association with the lower face of the horizontal flange of the side frame member 24 inasmuch as the headed end 70 of the stud 66 is effective to prevent movement of the stud in direction toward the opening 65 therein.

As best shown in Figs. 13, 14, and 15, a rocker 71 is mounted on the upwardly disposed face of the horizontal flange of the side frame member 24 and has an opening therein through which the stud 66 is extended, the head 70 of the stud 66 engaging the upwardly disposed face of the rocker 71 to hold it in engagement with the upwardly disposed face of the horizontal flange of the side frame member 24. The lever 64 is rigidly connected to the rocker 71 by a block B interposed between and welded or otherwise secured between the inner ends of the lever 64 and the rocker 71 as shown in Fig. 13. The lever 63 may be pivoted between a rest or latch-releasing position shown in dotted outline in Fig. 14 and a latching position shown in full lines in Fig. 14, and such movement is limited by engagement of the end corners of the block B with the horizontal flange of the frame member 24.

Studs as 72 and 73 are mounted in the rocker 71 adjacent to the head 70 of the stud 66 and in diametrical relation one with the other. A hook-shaped member 74 has one free end thereof pivotally mounted on the stud 73 and a link 75 is welded or otherwise suitably secured to the other end thereof, so as to extend to the left as shown in Fig. 14, and a similarly but reversely formed hook-shaped lever 74A and a similar associated link 75A are associated with the stud 73 so as to extend in the opposite direction. Hence, clockwise movement of the lever 64 is effective to impart movement to the links 75 and 75A toward the center of the truck or dolly, or inward away from the ends of the dolly, and such movement of these links is utilized as will be described, to release the respective pawls 63, while counter-clockwise movement of the lever 64 moves the links 75 and 75A toward the ends of the dolly, and this movement is utilized as will be described, to cause locking movement of the respective pawls 63. In accomplishing this control of the pawls 63, a substantially U-shaped bracket 76, Figs. 19 and 20, is pinned, welded, or otherwise suitably secured, to the lower face of the horizontally disposed flange of the side frame member 24 for supporting each such pawl 63, with the limbs 78 and 79 thereof extended downwardly away from the said flange. A rock shaft 77, Figs. 14, 19 and 20, is mounted in the limbs 78 and 79 of the bracket 76. The pawl 63 is fixed on the shaft 77 outwardly of the limb 79, as by welding as indicated by the head like portion 80 on the outer end of the shaft 77. A washer 81 is mounted on the shaft 77 outwardly of the limb 78 and a cotter key 82 is passed through the shaft 77 outwardly of the washer 81 and is effective to prevent longitudinal movement of the shaft 77 in the limbs 78 and 79.

The pawl 63 includes a projection 83 that extends beneath the lower end of the limb 79. A stud 84, Figs. 19 and 20, is provided on the upwardly disposed face of the projection 83 and is embraced by one end of the coil spring 85, the opposite end of such spring embracing a stud 87 secured to the under-face of the bight portion of the bracket 76. This spring 85 is normally effective on the projection 83 and therefore the pawl 63 to urge a nose portion 86 at the free end of the pawl toward the disc as 61 and into an opening 62 therein when such an opening moves into alignment with the nose portion 86, the pawl 63 being shown in such position in Fig. 17.

When the nose portion of the pawl 63 is to be disposed in the upper retracted position thereof, as shown in Fig. 18, a releasing force is applied to the pawl 63 in opposition to the spring 85. For this purpose a toe portion T is provided on the pawl 63 at the end of the pawl opposite the nose 86, and this toe portion is adapted to be engaged by a stud 88 on a rocker 89, pivotally mounted on the limb 79 as indicated at 90. As best shown in Figs. 14 and 17 to 20, inclusive, the free end of the link 75, or the link 75A, as the case may be, is extended through an opening 91 in the related rocker 89. When the rocker 71 and lever 64 are disposed in the normal at rest or releasing position thereof, shown in dotted outline in Fig. 14, the link 75 is in the position shown in Fig. 18, and the stud 88 on the rocker 89 engages the toe T of the pawl 63 so as to hold the lever 63 in the inoperative position thereof, as shown in Fig. 18. When, however, the lever 64 and rocker 71 are moved counter-clockwise, as viewed in Fig. 14 to the full line position there shown, the link 75 moves toward the left, as viewed in Figs. 14, 17 and 18, and this moves the rocker 89 from the position thereof shown in Fig. 18 into the position thereof shown in Fig. 17. This frees the pawl 63 to effect the spring 85 and therefore the nose 86 is urged toward the disc 61 as aforesaid.

By referring to Figs. 3, 4, 12 and 13, it will be seen that the free end of the lever 64, which extends outwardly of the vertical flange of the side frame member 24, is in position to be moved by either pressure of the hand or of the foot to effect aforesaid movement thereof between its releasing and latching positions. It will be observed in this connection that when the lever 64 is in its release position shown in dotted outline in Fig. 14, the relationship of the studs 72 and 73 to the links 75 and 75A is such that the force of the springs 85 tends to maintain the lever 64 in its release position. It will be understood that in the latching or releasing movements of the lever 63, the link 75A is effective through similar but reversely related structure to control a pawl similar to the pawl 63, thereby seating the nose 86 of such pawl in an opening 62 in a disc corresponding to the disc 61 shown in Fig. 14.

The seating of noses as 86 on pawls as 63 in openings as 62 in discs as 61 is effective to hold each caster C, of which such a disc is a part, against rotation about a vertical axis. Moreover, as shown in Figs. 12 and 14, this retains the wheels W of such caster arrangements in a position parallel to the axial extent of the rollers R. The disposition of the wheels W in this position therefore serves to prevent movement of the dolly in a direction transverse to the axial extent of the rollers R. Resort is had to this retention of the wheels W of the casters C when a roll of broadloom carpeting or the like is to be unwound from one or more of the novel dollies of this invention, as will be explained in further detail hereinafter.

It will be understood that when a novel dolly of this invention is to be used to transport a roll of carpeting from one place to another, that then the lever 64 is disclosed in the normal release position thereof shown in dotted outline in Fig. 14. As explained, this is effective to dispose each nose at 86 on a pawl as in 63 in the position shown in Fig. 18 and out of cooperation with the disc 61 and the openings 62 therein so that the casters C of which the wheels W are a part are then free to act as conventional casters like those associated with a side frame member 23.

In order to transport the dolly from one place to another, a means for pulling the same is incorporated in the frame F. To this end centrally located bosses as 92 and 93, Figs. 6, 7 and 16, are provided on the outwardly disposed faces of the side frame members 21 and 22 respectively. Openings 94 and 95 are formed in the side frame members 21 and 22 respectively to extend through bosses 92 and 93. A tube, generally indicated by 96, has the end portions thereof extended through the openings 94 and 95. The end portion of the tube 96 passes through the opening 94 and is screw threaded to receive a cap nut 97 and a lock nut 100. The end portion of the tube 96 in the opening 95 is also screw threaded to receive a lock nut 98, that is disposed inwardly of the end member 22, and also to receive a cap nut 99 that is disposed outwardly of the frame member 22. The nuts 97 and 99 are adjusted on the screw threaded end portions of the tube 96 to be brought into tight engagement with the adjacent faces of the bosses 92 and 93 and when this is effected the lock nut 98 is moved into engagement with the inner face of the frame member 22 and at the same time a lock nut 100 is moved into engagement with the inner face of the side frame 21. It will, therefore, be seen that the tube 96 is firmly anchored in and supported by the frame member 21 and 22.

As is best shown in Fig. 7, the boss 92 is located medially in the frame member 21 and the handle arrangement that is to be mounted in the tube 96 which is disposed in the opening 94 and the boss 92 is therefore located medially of the dolly. In the present instance, the cap nut 91 has an opening 101, Fig. 16, formed therein through which a tube 102 may be passed to be extended into the tube 96. A cable 103 has one end thereof firmly fixed in the inner end portion of the tube 102 and the other end thereof is firmly anchored in an abutment as block 104 disposed in the tube 96. A knob 105 is mounted on the front end of the tube 102 that projects beyond the cap nut 99. Normally the tube 102 and the cable 103 and knob 105 are disposed in the position shown in Figs. 6 and 16 with the inner end of the knob 105 in engagement with the outer face of the cap nut 99. When, however, the dolly is to be transported from one point to another, the knob 105 is grasped and the tube 102 is withdrawn from the tube 96. So long as a substantial portion of tube 102 is disposed inwardly of the cap nut 99, it is necessary that the handle be drawn forwardly in such a manner that tubes 96 and 102 remain coaxial. When, however, the cable 103 passes through the opening 101 and the inner end of the block 104 is brought into engagement with the abutment represented by the inner marginal portion around the opening 101, then the cable 103, as shown in broken lines in Fig. 16 and in Fig. 2, affords a flexible connection between the handle afforded by the tube 102 and knob 105 and the dolly, the handle thus afforded being shown in its extended position in Fig. 2. When not in use, the tube 102 and therefore the cable 103 are disposed in the tube 96 in the manner shown in Fig. 16 so that the handle is disposed in an out of the way position in the dolly.

By referring to Fig. 7, it will be seen that the various bosses as 32 and, the associated parts, such as the cotter keys 34, are exposed to view which is undesirable. Therefore, to impart a more finished appearance to the dolly of the present invention, cover plates as 106 are provided which are shaped complementary to the end members 21 and 22. Again referring to Fig. 7, it will be seen that the medial portion of the outwardly disposed face of the frame member 21 is cored out except at certain areas as 107. As best shown in Fig. 11 the medial part of the cover 106 is also cored out except in the area whereat the bosses 108 are afforded. It will be understood that the various bosses 107 on the end member 21 are disposed in position to cooperate with the inwardly disposed faces of the bosses 108 on the cover 106. The cover 106 is secured to the outer face of the frame member 21 by screws as 109, Fig. 11, which pass through openings in the bosses 107 into tapped openings 110 and the bosses 108. When each of the covers 106 is secured in position by bolts as 109, the top flanges 111 thereof, Fig. 16, project over the upper edges of the side frame members 21 and 22. Moreover, by referring to Fig. 16, it will be noted that the cap nuts 97 and 99, respectively, project through openings afforded in the covers 106. In Fig. 10, we have illustrated the manner in which the lower edges of the end member 21 and the cover 106 are related one to the other. Hence, as can be seen by comparing Figs. 5 and 7, the provision of covers as 106 materially enhances the appearance of the dolly of the present invention.

Figure 2:
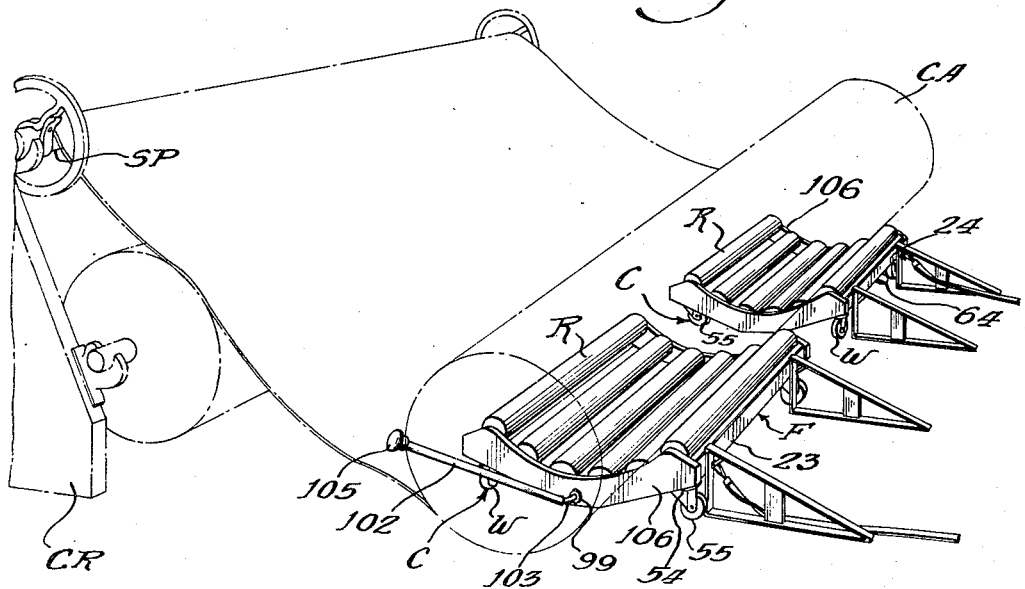
Fig. 2 is another perspective view showing the manner in which a roll of broadloom carpeting is supported by the dollies of this invention during the winding of such carpeting onto a spindle in a rack.

When a roll of broadloom carpeting or the like is to be transported on one or more of the novel dollies of this invention, the roll of carpeting is disposed on the rollers R of such dolly or dollies much in the manner shown in Fig. 2 where a roll of broadloom carpeting is shown in broken lines in association with the rollers R of two dollies of the present invention. In this particular instance the roll of carpeting is much longer than could be conveniently transported by one dolly and for this reason two dollies are employed which are arranged in endwise alignment and in spaced relation one with the other.

When a roll of carpeting as CA or the like is to be disposed on the rollers R it is advantageous to resort to ramps as RA and RB which are of substantially triangular configuration and when they are to be used with the dollies of the present invention they are disposed to have their vertically extending portions engaged with either the side frame member 23 or the side frame member 24, as illustrated in Fig. 1. Straps as S are associated with the ramps RB and extend therefrom beyond the roll of carpeting as CA that is to be disposed on the rollers as R of the dollies. By grasping the straps S the roll of carpeting may be rolled up the ramps RA and RB and onto the rollers R.

Of course, it will be necessary to hold the dollies D against movement transversely of the rollers R when a roll of carpeting is to be introduced onto the rollers R in the above described manner. When this is desired, the lever 64 is moved in a counter-clockwise direction, as viewed in Fig. 14, as by pressing the lever 64 in this direction with the foot. As explained, movement of the lever 64 in this direction is effective to free pawls as 63 for movement toward discs as 61 to thereby hold the casters C of which the discs 61 are apart against rotation on a vertical axis. As shown in Figs. 12 and 14 this locks the wheels W of such casters C in parallel relation with the rollers R. This is effective to prevent movement of the dolly in a direction transverse of the rollers R so that when, for example, the dollies shown in Fig. 1 have the wheels W of the caster C thereof locked in the aforesaid positions, the dollies are held against movement transversely of the rollers while the roll of carpeting is rolled onto the rollers R.

As shown in Fig. 2 the dollies of the present invention may be advantageously employed when carpeting as CA is to be wound on the spindle as SP of a rack as CR. When the dollies are to be so employed the wheels W are disposed in the aforesaid parallel relation with the rollers R so as to again prevent movement of the dollies in a direction transverse of the rollers R.

It would be manifest from the foregoing description that our novel dolly enables the hereinabove set forth and kindred objects of this invention to be realized. Moreover, while we have illustrated and described our preferred embodiment of our invention, it is to be understood that this is capable of variation and modification, and I therefore do not wish to be limited to the precise details set forth, but desired to avail myself of such changes and alterations as fall within the purview of the following claims.

We claim:

1. In a dolly, a pair of end frame members of downwardly convex form, a pair of parallel side frame members rigidly connecting the ends of said end frame member to form a rectangular frame structure, casters on said frame structure for movably supporting the same, a plurality of rollers supported in said end frame members in spaced relation to each other and parallel to said side frame members with the upper surfaces of said rollers being disposed above the level of aligned portions of said end frame members to thereby afford a supporting cradle upon which a roll of carpet or the like may be rotatably supported, a mounting tube supported between said end frame members parallel to and below the upper surfaces of said rollers, one of said end frame members having an opening therethrough into said tube, a handle adapted to be disposed within said tube and having an outer end and an inner end, said inner end having a short flexible cable fixed thereto, said outer end being extended beyond said one of said end frame members when said handle is disposed within said tube, said flexible cable having an abutment element thereon disposed within said tube, a fixed abutment member extended radially inwardly with respect to said tube for engagement by said abutment element, to limit withdrawing movement of said handle from said tube, the length of the unencumbered portion of said cable being such as to provide a substantial clearance between the inner end of said handle and the outer side of said one of said end frame members when said handle is withdrawn from said tube to the extent of engagement between said abutments thereby affording a flexible handle connection for said dolly.

2. In a dolly, a pair of end frame members of downwardly convex form, a pair of parallel side frame members rigidly connecting the ends of said end frame member, casters on said frame members for movably supporting the dolly, a plurality of rollers supported in said end frame members in spaced relation to each other and parallel to said side frame members with the upper surfaces of said rollers being disposed above the level of aligned portions of said end frame members to thereby afford a supporting cradle upon which a roll of carpet or the like may be rotatably supported, a mounting tube supported between said end frame members parallel to and below the upper surfaces of said rollers and extended at one end through one of said end members, a handle adapted to be disposed within said tube and having an outer end and an inner end, said inner end having a flexible portion fixed thereto, said outer end being extended beyond said one of said end frame members when said handle is disposed within said tube, said flexible portion having an abutment element thereon disposed within said tube, a fixed abutment member adjacent said one end of said tube for engagement by said abutment element to limit withdrawing movement of said handle from said tube, the length of the unencumbered section of said flexible portion being such as to provide a substantial clearance between the inner end of said handle and the outer side of said one of said end members when said handle is withdrawn from said tube to the extent of engagement between said abutments thereby affording a flexible handle connection for said dolly.

3. In a dolly, a pair of end frame members of downwardly convex form, a pair of parallel side frame members rigidly connecting the ends of said end frame member, casters on said frame members for movably supporting the dolly, said end frame members having aligned upwardly opening mounting slots formed therein, a plurality of rollers each rotatably mounted on a central supporting shaft that projects in each instance beyond the ends of its roller, said projecting ends of the respective shafts being supported and fixed in said aligned slots in said end frame members to support said rollers in spaced relation to each other and parallel to said side frame members with the upper surfaces of said rollers being disposed above the level of aligned portions of said end frame members to thereby afford a supporting cradle upon which a roll of carpet or the like may be rotatably supported, a mounting tube supported between said end frame members parallel to and below the upper surfaces of said rollers and opening through one of said end frame members, a handle adapted to be disposed within said tube and having an outer end and an inner end, said inner end having a short flexible cable fixed thereto, said outer end being extended beyond said one of said end frame members when said handle is disposed within said tube said flexible cable having an abutment element thereon disposed within said tube, a fixed abutment member extended radially inwardly with respect to said tube for engagement by said abutment element to limit withdrawing movement of said handle from said tube, the length of the unencumbered portion of said cable being such as to provide a substantial clearance between the inner end of said handle and the outer side of said one of said end frame members when said handle is withdrawn from said tube to the extent of engagement between said abutments thereby affording a flexible handle connection for said dolly.

4. In a dolly comprising a frame, casters on said frame on which the dolly may be moved from one location to another, an open-ended tube disposed in said frame, a handle member comprising a rigid portion and a flexible portion adapted to be moved endwise into said tube when not in use, said rigid portion having an inner end disposed within said tube when said handle is not in use, one end of said flexible portion being connected to said rigid portion and the other end of said flexible portion being free, and a pair of abutment means for preventing the flexible portion of said handle from being completely withdrawn from said tube, one of said abutment means being attached to the free end of said flexible portion and the other being fixed adjacent the open end of said tube.

5. In a dolly comprising a frame, casters on said frame on which the dolly may be moved from one location to another, an open-ended tube disposed in said frame, a handle member comprising a rigid portion and a flexible portion adapted to be moved endwise into said tube when not in use, said rigid portion having an inner end disposed within said tube when said handle is not in use, one end of said flexible portion being connected to said rigid portion and the other end of said flexible portion being free, and abutment means mounted respectively adjacent the free end of said flexible portion and in a rigid relation within and with respect to said tube for preventing the free end of the flexible portion of said handle from being withdrawn from said tube.

6. In a dolly comprising a frame, casters on said frame on which the dolly may be moved from one location to another, a tube disposed in said frame, a handle member comprising a rigid tubular portion and cable having one end extended into and anchored within said rigid tubular portion and the other end of the cable projecting beyond said tubular portion to afford a flexible portion, the end of said flexible portion projecting beyond said tubular portion being free, said handle being adapted to be moved endwise into said tube when not in use, and abutment means mounted respectively on the said free end of said flexible portion and in a rigid relation within and with respect to said tube for preventing the flexible end portion of said handle from being fully withdrawn from said tube.

7. In a dolly, a set of crescent shaped end frame members, a set of side frame members extended between the end frame members and rigidly connected thereto, rollers mounted in said crescent shaped end members, casters mounted on rotatable caster supports on opposite ones of the frame members and on which the dolly may be moved from one location to another, and means for locking at least two of said casters in positions such that said dolly may be moved only in a direction parallel to said rollers, said last-named means comprising a first rocker at one point on one of said frame members and adapted to be rocked in a horizontal plane and a second rocker adjacent each of the said two casters and adapted to be rocked in a vertical plane, links secured to and interconnecting said rockers, a disc secured to each of the rotatable supports corresponding to the said two casters, said discs each being provided with an opening, a pawl pivotably mounted adjacent each of said two casters and each having a nose portion adapted to engage said openings to hold the corresponding caster support against rotation, each of said pawls being provided with a toe portion, and a stud on each of said second rockers engaging said toe portions.

8. In a dolly, a set of crescent shaped end frame members, a set of side frame members extended between the end frame members and rigidly connected thereto, rollers mounted in said crescent shaped end members, casters mounted on rotatable caster supports on opposite ones of the frame members and on which the dolly may be moved from one location to another, a locking lever accessible at the outer side of one of said side frame members and shiftably mounted thereon, and locking means operated by said locking lever for locking at least two of said casters in position such that said dolly may be moved only in a direction parallel to said rollers, said last-named means comprising a first rocker at one point on one of said frame members and adapted to be rocked in a horizontal plane and a second rocker adjacent each of the said two casters and adapted to be rocked in a vertical plane, links secured to and interconnecting said rockers, a disc secured to each of the rotatable supports corresponding to the said two casters, said discs each being provided with an opening, a pawl pivotably mounted adjacent each of said two casters and each having a nose portion adapted to engage said openings to hold the corresponding caster support against rotation, each of said pawls being provided with a toe portion, and a stud on each of said second rockers engaging said toe portions.

9. In a dolly, a set of crescent shaped end frame members, a set of side frame members extended between the end frame members and rigidly connected thereto, rollers mounted in said crescent shaped end members, casters mounted on rotatable caster supports on opposite ones of the frame members and on which the dolly may be moved from one location to another, and means for locking at least two of said casters in positions such that said dolly may be moved only in a predetermined direction with respect to said rollers, said last-named means comprising a first rocker at one point on one of said frame members and adapted to be rocked in a horizontal plane and a second rocker adjacent each of the said two casters and adapted to be rocked in a vertical plane, links secured to and interconnecting said rockers, a disc secured to each of the rotatable supports corresponding to the said two casters, said discs each being provided with an opening, a pawl pivotably mounted adjacent each of said two casters and each having a nose portion adapted to engage said openings to hold the corresponding caster support against rotation, each of said pawls being provided with a toe portion, and a stud on each of said second rockers engaging said toe portions.

10. In a dolly, a set of crescent shaped end frame members, a set of side frame members extended between the end frame members and rigidly connected thereto, rollers mounted in said crescent shaped end members, casters mounted on rotatable caster supports on opposite ones of the frame members and on which the dolly may be moved from one location to another, a locking lever accessible at the outer side of one of said frame members and shiftably mounted with respect thereto, and locking means operated by said locking lever for locking at least two of said casters in positions such that said dolly may be moved only in a predetermined direction with respect to said rollers, said last-named means comprising a first rocker at one point on one of said frame members and adapted to be rocked in a horizontal plane and a second rocker adjacent each of the said two casters and adapted to be rocked in a vertical plane, links secured to and interconnecting said rockers, a disc secured to each of the rotatable supports corresponding to the said two casters, said discs each being provided with an opening, a pawl pivotably mounted adjacent each of said two casters and each having a nose portion adapted to engage said openings to hold the corresponding caster support against rotation, each of said pawls being provided with a toe portion, and a stud on each of said second rockers engaging said toe portions.

11. In a dolly or the like for rotatably supporting a roll of carpet, a frame having rigidly related and substantially spaced plate-like end members, said end members having walls affording aligned pairs of laterally spaced upwardly opening mounting sockets therein, mounting shafts disposed with their ends located in the sockets of the respective pairs, said frames being formed with substantially horizontal pin-receiving slots extended transversely and diametrically through the walls of said mounting sockets, retaining pins mounted in said pin-receiving slots and extended through the shafts to hold said shafts in said sockets, and rollers rotatably mounted on said shafts.

12. In a dolly or the like for rotatably supporting a roll of carpet, a frame having rigidly related and substantially spaced plate-like end members, said end members having walls affording aligned pairs of laterally spaced upwardly opening mounting sockets therein, flanges extended outwardly of each of said sockets and opening upwardly therewith, said frames being formed with substantially horizontal slots extended transversely and diametrically through the walls of said flanges through which slots retaining elements may be extended to pass through and retain bearing shafts or the like in said mounting sockets for rotatably supporting rollers in the dolly.

LEON H. BEST.
OSCAR W. JOHNSON.

References Cited in the file of this patent
UNITED STATES PATENTS

| Number | Name | Date |
|---|---|---|
| 166,345 | Crawshaw | Aug. 3, 1875 |
| 342,532 | O'Brien | May 25, 1886 |
| 870,739 | McIntyre | Nov. 12, 1907 |
| 1,360,424 | McGaughy | Nov. 30, 1920 |
| 1,515,824 | Best | Nov. 18, 1924 |
| 1,615,149 | Trebes | Jan. 18, 1927 |
| 1,695,928 | Perin | Dec. 18, 1928 |
| 1,771,082 | Gignac | July 22, 1930 |
| 1,870,403 | Coffing | Aug. 9, 1932 |
| 1,940,556 | Miller | Dec. 19, 1933 |
| 1,958,494 | Pehrsson | May 15, 1934 |
| 2,267,962 | Tishken | Dec. 30, 1941 |
| 2,337,790 | Williams | Dec. 28, 1943 |
| 2,469,242 | Pohl | May 3, 1949 |
| 2,493,485 | Geistert | Jan. 3, 1950 |
| 2,494,997 | Geistert | Jan. 17, 1950 |
| 2,551,190 | Walker | May 1, 1951 |